United States Patent
Webb

(10) Patent No.: US 9,547,289 B2
(45) Date of Patent: Jan. 17, 2017

(54) FIELD-CONFIGURABLE USER INTERFACE CIRCUIT AND METHOD OF INSTALLATION

(71) Applicant: Ledgestone Holdings, LLC, Austin, TX (US)

(72) Inventor: Richard Bruce Webb, Austin, TX (US)

(73) Assignee: Ledgestone Holdings, LLC, Austin, TX (US)

( * ) Notice: Subject to any disclaimer, the term of this patent is extended or adjusted under 35 U.S.C. 154(b) by 565 days.

(21) Appl. No.: 14/028,361

(22) Filed: Sep. 16, 2013

(65) Prior Publication Data

US 2015/0081049 A1    Mar. 19, 2015

(51) Int. Cl.
  *G06F 3/00*  (2006.01)
  *G05B 15/02*  (2006.01)

(52) U.S. Cl.
  CPC .................................. *G05B 15/02* (2013.01)

(58) Field of Classification Search
  None
  See application file for complete search history.

(56) References Cited

U.S. PATENT DOCUMENTS

| | | | | |
|---|---|---|---|---|
| 5,016,347 A | * | 5/1991 | Okazaki | H02G 1/1256 29/33 M |
| 6,028,976 A | * | 2/2000 | Sato | G02B 6/4404 385/114 |
| 6,859,854 B2 | * | 2/2005 | Kwong | G06F 3/0607 361/679.33 |
| 2002/0095074 A1 | * | 7/2002 | Al-Ali | A61B 5/14552 600/310 |
| 2005/0045726 A1 | * | 3/2005 | Terlizzi | G06K 7/10881 235/454 |
| 2009/0061678 A1 | * | 3/2009 | Minoo | G06F 21/44 439/502 |

* cited by examiner

*Primary Examiner* — Elias Mamo
(74) *Attorney, Agent, or Firm* — Cesari & Reed LLP; R. Michael Reed

(57) ABSTRACT

A method includes determining a type of controller used by an electronic device and determining a connector configuration of the electronic device. The method further includes selectively cutting one or more wires of a ribbon cable of a user interface circuit in response to determining the type of controller to configure the user interface circuit for operation with the type of controller.

20 Claims, 7 Drawing Sheets

FIELD-CONFIGURABLE USER INTERFACE CIRCUIT AND METHOD OF INSTALLATION

FIELD

The present disclosure is generally related to interfaces for household appliances, and more particularly, to user interface circuits for appliances such as dishwashers, stoves, ovens, washing machines, and the like.

BACKGROUND

In recent years, electric appliances, such as ovens, dishwashers, washing machines, and other household appliances have included increasingly sophisticated control circuitry programmed by the manufacturer to implement various functions. The user interface to such control circuitry often includes a printed circuit board configured to couple to the control interface. However, over time, such circuit boards are prone to failure. In particular, heat, humidity, excessive pressure applied by the user, and other factors may cause such boards to fail.

Repair of an appliance with a failed circuit board may require replacement of the entire control panel, which includes the circuit board and the touch panel. To support service and repair, manufacturers must maintain an inventory of replacement parts.

Further, each appliance has its own user interface, and has its own control circuit configured to operate with the user interface. Typically, the manufacturer must maintain an inventory of replacement parts for each model and for each controller. Since manufacturers frequently introduce new models, the inventory of replacement parts may be very large. As models are discontinued, the replacement parts may also be discontinued, forcing appliance owners to replace their appliances rather than repairing them.

SUMMARY

In an embodiment, a method includes determining a type of controller used by an electronic device and determining a connector configuration of the electronic device. The method further includes selectively cutting one or more wires of a ribbon cable of a user interface circuit in response to determining the type of controller to configure the user interface circuit for operation with the type of controller.

In another embodiment, a user interface includes a circuit board including a plurality of wire traces formed thereon and a ribbon cable including a plurality of wires configured to couple to the plurality of wire traces and configured to couple to an external circuit. The ribbon cable is configurable for use with a plurality of types of controllers by selectively cutting one or more of the plurality of wires of the ribbon cable based on the type of controller.

In still another embodiment, a user interface includes a circuit board including a plurality of circuit structures interconnected by at least one programmable wire trace matrix. The user interface further includes a ribbon cable including a plurality of wires configured to couple to the circuit board and to an external circuit. The ribbon cable includes a punch out region extending over at least some of the plurality of wires. The ribbon cable is configurable by a user to allow the circuit board to function in connection with the external circuit by selectively cutting one or more of plurality of wires within the punch out region.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Conventionally, repair of a control panel of a household appliance, such as a washing machine or oven, required replacement of the entire control panel, even if the failed component is a circuit board. Servicing such devices requires having a large inventory of replacement control panels in stock, or requires the technician to visit the sight multiple times, driving to an on-site location to complete the inspection and repair (i.e., multiple "truck rolls"). In an example, a service technician may visit a user's home to diagnose the problem (first truck roll), call in a parts order, and then return to the user's home to complete the repair once the part is received (second truck roll). Unfortunately, during the intervening period, the user's device is not available for use. Moreover, from the service company's perspective, the second "truck roll" is inefficient.

Embodiments of a user interface circuit and user buttons overlay are described below that can be used with a wide variety of appliance models and that can be configured by the technician in the field to operate with different control circuits. In an embodiment, the user interface circuit includes a configurable ribbon cable including wires coupled to wire traces of the user interface circuit. One or more of the wires of the ribbon cable may be cut by the technician in the field to configure the user interface circuit for the control circuit of the particular appliance to be repaired. Further, the user interface circuit includes a programmable wire-trace matrix coupled to wires of the ribbon cable that may be programmed to couple a plurality of button circuits to the controller through the configurable ribbon cable. Additionally, a user buttons overlay may be applied to a surface of the user interface circuit to provide a user-accessible interface for controlling the appliance.

It should be appreciated that the field-configurable user interface circuit described above may be implemented for a variety of appliances and electronic devices. One possible example of an appliance with which the field-configurable user interface circuit may be used is described with respect to FIG. 1.

Figure 1:
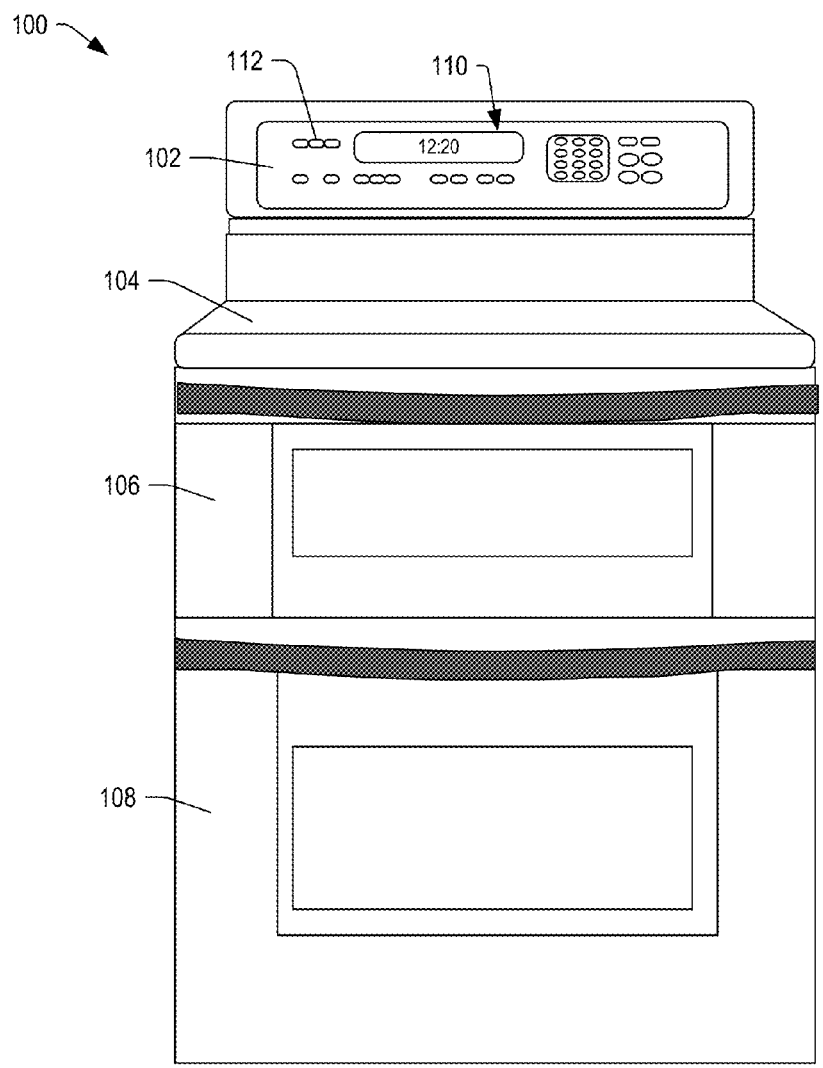
FIG. 1 is a perspective view of an oven including a control panel having a user interface.

FIG. 1 is a perspective view of an oven 100 including a control panel 102 having a user interface (display 110 and buttons 112). Oven 100 further includes a stove top 104, an upper oven 106, and a lower oven 108. Buttons 112 may be touch-sensitive areas, such as capacitive or resistive circuits configured to detect user interactions with the surface of the control panel 102. Alternatively, buttons 112 may be depressible elements providing haptic feedback to the user. Control panel 102 is accessible by the user to activate and control operation of the oven 100.

Figure 2:
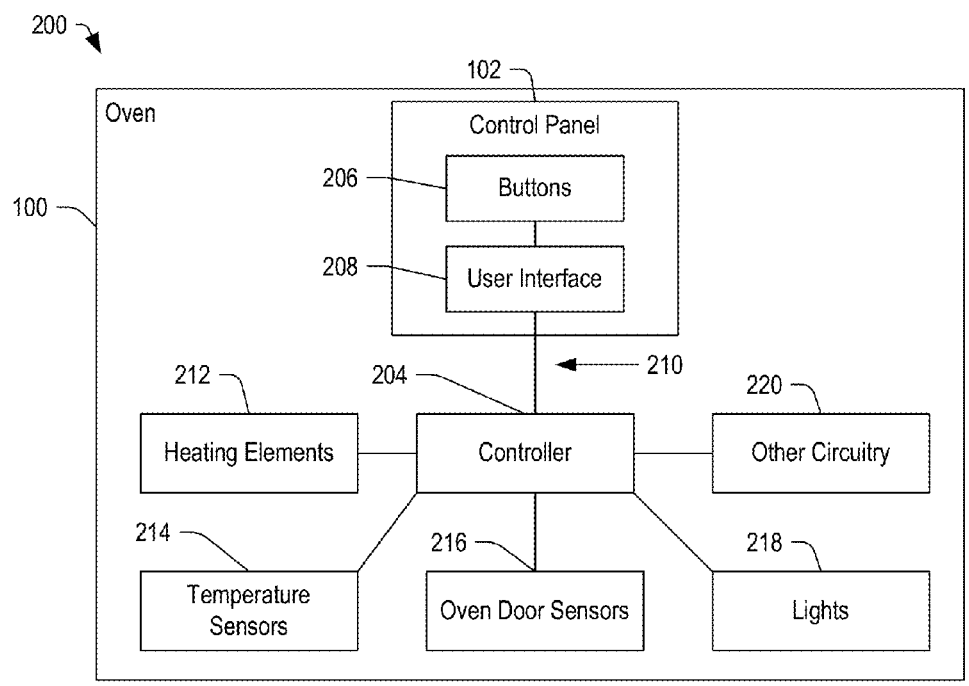
FIG. 2 is a simplified block diagram of the oven of FIG. 1.

FIG. 2 is a simplified block diagram 200 of the oven 100 of FIG. 1. Oven 100 includes control panel 102 coupled to a controller 204. Controller 204 is coupled to heating elements 212, temperature sensors 214, oven door sensors 216, lights 218, and other circuitry 220. In an example, other circuitry can include ignition elements configured to ignite a gas range or oven, power circuitry, etc. Control panel 102 includes buttons 206 coupled to a user interface 208, which is coupled to controller 204.

It should be appreciated that each type of household appliance may have a different controller. Further, each appliance model may also have a different controller configured to provide the functionality for the particular appliance and model. To make such variations possible, the manufacturers typically make different interfaces for each appliance and for each model. One example of a replacement control panel is described below with respect to FIG. 3.

Figure 3:
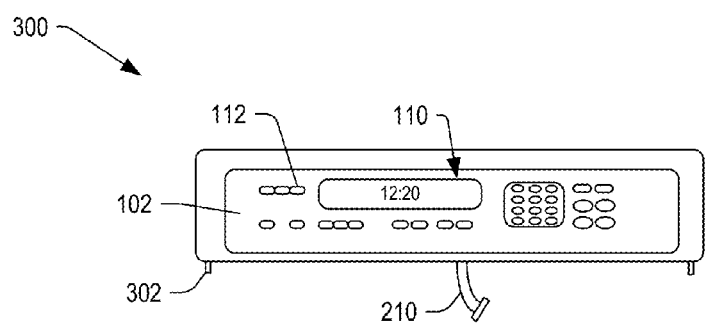
FIG. 3 is a perspective view of a conventional replacement control panel for the oven of FIG. 1.

FIG. 3 is a perspective view of a conventional replacement control panel 300 for the oven of FIG. 1. Replacement control panel 300 includes attachment structures 302 configured to attach to corresponding features of the oven 100. Further, replacement control panel 300 includes interface 210 (implemented as a ribbon cable) to interconnect the control panel 300 to the controller 204.

In an example, a technician will drive to a residence to inspect an oven 100 in response to a service call. The technician may diagnose a faulty control panel and may call in a part order for the particular model. Once the part arrives at the facility, the technician will once again drive to the residence, this time to remove the control panel and to install the replacement control panel 300. Thus, the repair may require two "truck rolls", one to diagnose and one to repair the oven 100. It would be preferable for the service company to be able to provide a control panel that can be on the technician's truck for repairing a wide variety of appliances without having to visit the residence twice. One possible example of a field-configurable user interface circuit that provides such functionality and efficiency is described below with respect to FIG. 4.

Figure 4:
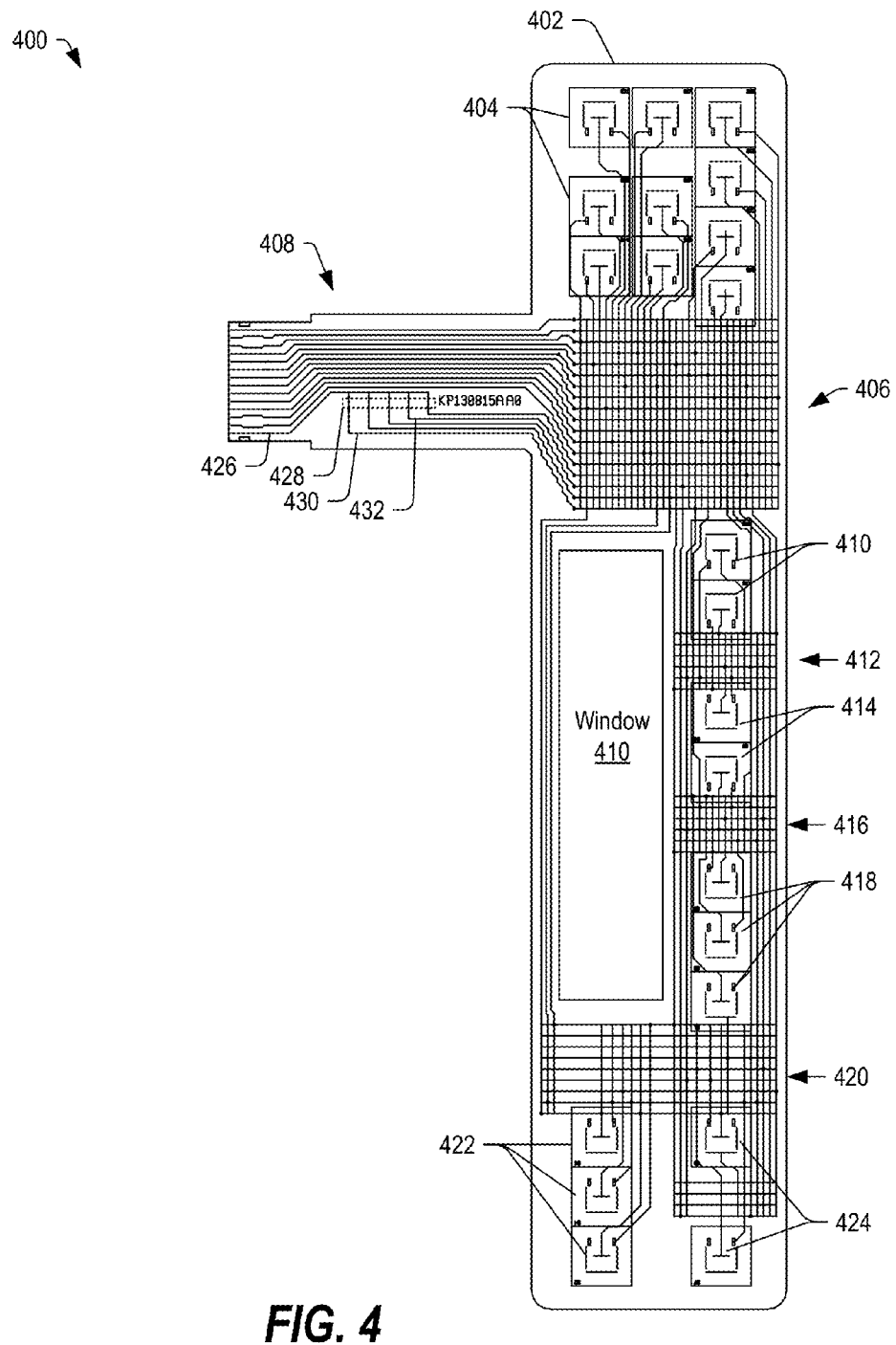
FIG. 4 is a diagram of a field-configurable user interface circuit according to an embodiment.
Figure 8:
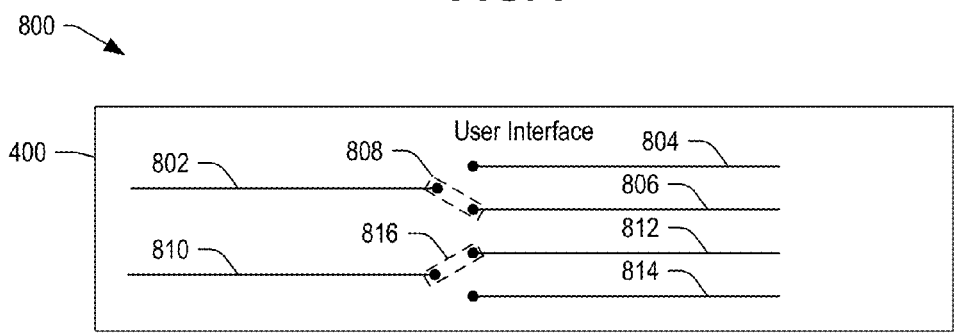
FIG. 8 is an illustrative example of a portion of a field-configurable user interface that includes field-programmable matrix elements according to an embodiment.

FIG. 4 is a diagram of a field-configurable user interface circuit 400 according to an embodiment. Circuit 400 includes a flexible circuit board 402 including a plurality of wire traces and circuit structures that may be configured to enable touch panel functionality. Flexible circuit board 402 includes button structures 404, 410, 414, 418, 422, and 424 formed at various locations. Further, flexible circuit board 402 includes a ribbon cable 408 configured to form the interface 210 of control panel 102 in FIG. 2. Ribbon cable 408 includes a plurality of wires coupled to a first programmable matrix 406 of wire traces, which interconnect controller 204 to button structures 404 and 410 and to a display circuit, which is proximate to a transparent window 410. As used herein, a matrix of wire traces refers to a first set of wire traces on a first layer of a circuit board and a second set of wire traces on a second layer of the circuit board, where at least some of the wire traces of the first set are coupled to some of the wire traces of the second set through conductive vias extending between the first and second layers. In the illustrated example, matrix 406 includes a first set of wire traces extending in a first direction and a second set of wire traces extending in a second direction. In some instances, portions of the matrix may be formed by separate wire traces extending in the same direction that can be selectively coupled to form an interconnection with the matrix (as depicted in FIG. 8).

Flexible circuit board 402 further includes a second programmable matrix of wire traces 412 configured to couple first programmable matrix 406 to button structures 414. Flexible circuit board 402 also includes a third programmable matrix of wire traces 416 configured to couple first programmable matrix 406 to button structures 418, and includes a fourth programmable matrix of wire traces 420 configured to couple first programmable matrix 406 to button structures 422 and 424.

In an embodiment, a technician preparing to install the field-configurable user interface circuit 400 determines the type of controller 204 of the appliance to be fixed. Though each controller may be configured to connect to the same size of ribbon cable, in some instances, not all of the wire traces of the ribbon cable are used. To configure the field-configurable user interface circuit 400, the technician may need to cut one or more of the wires of ribbon cable 408 so that circuit 400 responds appropriately and as expected to detection signals from the controller. Thus, once the technician determines the type of controller, the technician may look up the controller 204 in a table of controllers, which table may include an indication of which of the wires within ribbon cable 408 should be cut. The technician may then punch one or more holes through the ribbon cable 408 at locations corresponding to the particular wires to be cut, thereby severing the identified wires to configure field-configurable user interface circuit 400 for the particular controller. By cutting a wire, an open circuit is created with respect to the particular wire.

In the illustrated example, ribbon cable 408 includes a wire 426, which is divided into five separate wires at punch out region 428 on ribbon cable 408. In this area, the wires are separated by sufficient spacing to permit the technician to punch through the ribbon cable 408 and the selected wire, such as wire 430, wire 432, another wire trace, or any combination thereof, without punching through other wires. Thus, the technician may configure field-configurable interface circuit 400 by punching through one or more of the wires within punch out region 428 according to a configuration specified in the table. Thus, by providing a punch out region 428 for selectively cutting up to five (5) wires, the field-configurable user interface 400 can be configured for thirty-two (32) different controllers. Though five wires are depicted within the punch out region 428, the disclosure is not so limited. In an embodiment, a particular ribbon cable 408 may be configured to have a larger number of wires within the punch out region 428 to provide additional configurability. Further, though the ribbon cable 408 is depicted as being substantially straight, in other embodiments, the ribbon cable 408 may have bulges, extensions, or areas that extend out from the rest of the ribbon cable to provide additional punch through regions.

In an embodiment, programmable wire-trace matrices 410, 412, 416, and 420 may be programmed during fabrication of the circuit board. Alternatively, the matrices 410, 412, 416, and 420 may include one or more connectors or switches that may be accessed by the technician to configure the matrices. In one example, the matrices may include one or more jumpers and/or external connectors that may be applied by the technician to configure interconnections within one or more of the matrices 410, 412, 416, and 420. The jumper configuration may also be specified in the table for the particular model number of control unit, providing further field-programmability.

In an example, field-configurable user interface 400 may be part of an appliance repair kit that includes several different field-configurable user interfaces 400 that may include a different wire trace configuration, different button locations, different transparent window size, shape, and/or location, or any combination thereof. Further, the repair kit may include one or more overlays that include user buttons that correspond to the selected user interface 400. One possible example of such a kit is described below with respect to FIG. 5.

Figure 5:
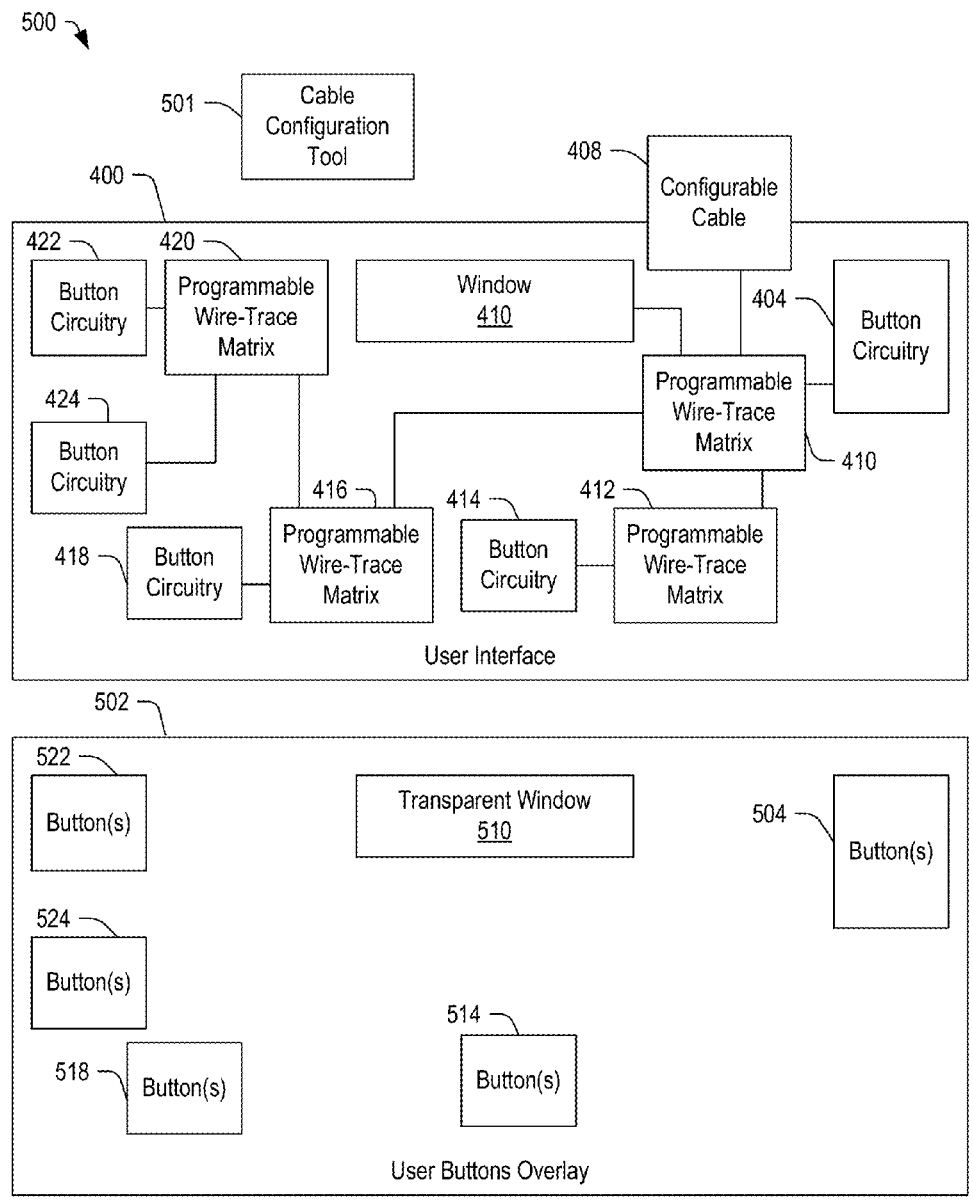
FIG. 5 is a block diagram of an appliance repair kit including a cable configuration tool, a field-configurable user interface circuit, and a user buttons overlay according to an embodiment.

FIG. 5 is a block diagram of an appliance repair kit 500 including a cable configuration tool 501, a field-configurable user interface circuit 400, and a user buttons overlay 502 according to an embodiment. Cable configuration tool 501 may include a hole punch that may be aligned to a selected wire trace within ribbon cable 408 and may be used by the technician to punch through the wire trace, such as wire trace 432 in FIG. 4. In an alternative example, cable configuration tool 501 may include one or more buttons that the technician may select to configure the cable configuration tool 501 to cut through the appropriate wire trace or traces.

Field-configurable user interface circuit 400 includes ribbon cable 408 coupled to programmable wire-trace matrix 410, which is coupled to button circuitry 404, a display component corresponding to window 410, and to programmable matrices 412 and 416. Field-configurable user interface circuit 400 includes button circuitry 414 coupled to programmable wire-trace matrix 412, and includes button circuitry 418 coupled to programmable wire-trace matrix 418. Field-configurable user interface circuit 400 further includes a programmable wire-trace matrix 420 coupled to programmable wire-trace matrix 416 and to button circuitry 422 and 424. It should be appreciated that, by linking one programmable wire-trace matrix, such as matrix 420, to another (such as programmable wire-trace matrix 410), field-configurable user interface circuit 400 may be programmed for a large variety of button configurations and controllers.

User buttons overlay 502 includes a transparent window 510 that is aligned to window 410, as well as buttons 504, 514, 518, 522, and 524 aligned to button circuitry 404, 414, 418, 422, and 424, respectively. The user buttons overlay 502 may include an adhesive backing that is configured to secure the overlay to a surface of field-configurable user interface circuit 400 to provide a control panel interface, which may be coupled to the housing of the appliance to provide the control panel 102. One possible example of the resulting structure of the control panel interface is described below with respect to FIG. 6.

Figure 6:
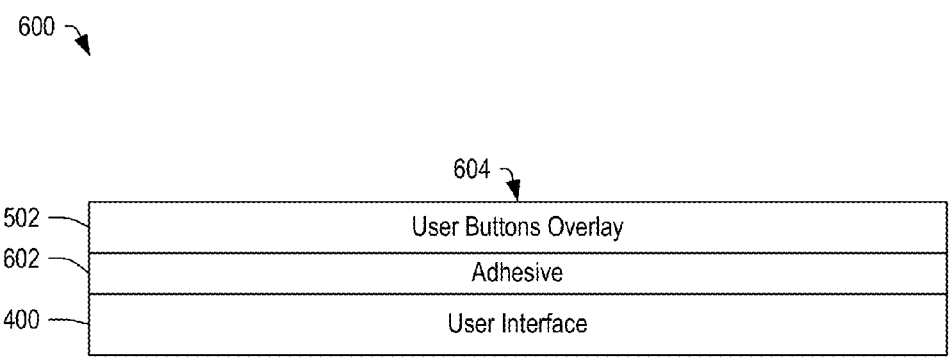
FIG. 6 is a cross-sectional view of the control panel interface formed using the field-configurable user interface circuit and user buttons overlay according to an embodiment.

FIG. 6 is a cross-sectional view of the control panel interface 600 formed using the field-configurable user interface circuit 400 and user buttons overlay 502 according to an embodiment. Control panel interface 600 includes an adhesive layer 602 to couple the field-configurable user interface circuit 400 and the user buttons overlay 502. It should be appreciated that the layers of control panel interface 600 are not necessarily drawn to scale, but rather are presented for illustrative purposes only. In this example, user buttons overlay 502 provides a smooth surface, and the underlying button circuitry may provide proximity detection functionality, such as capacitive and/or resistive touch sensing functionality. In an alternative example, described with respect to FIG. 7, the user buttons overlay 502 may include raised buttons.

Figure 7:
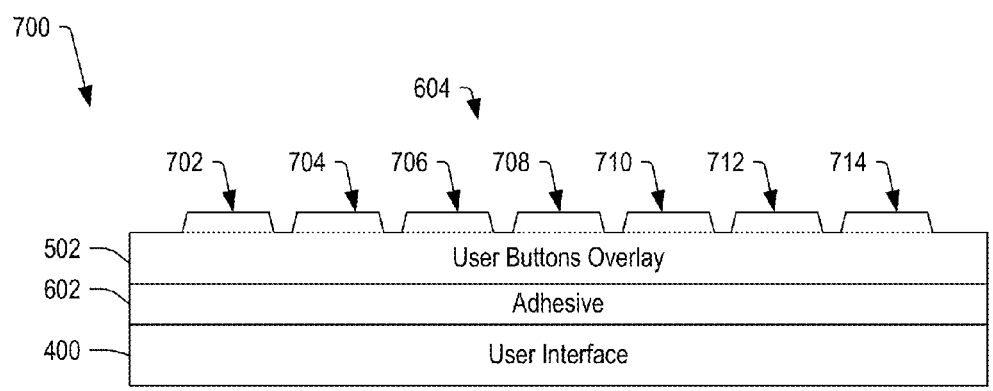
FIG. 7 is a cross-sectional view of the control panel interface formed using the field-configurable user interface circuit and user buttons overlay according to a second embodiment.

FIG. 7 is a cross-sectional view of the control panel interface 700 formed using the field-configurable user interface circuit 400 and user buttons overlay 502 according to a second embodiment. In this example, user buttons overlay 502 includes raised buttons 702, 704, 706, 708, 710, 712, and 714. The buttons 702, 704, 706, 708, 710, 712, and 714 may include a spring-like structure (such as a spring, a dome-shaped element, or other component) configured to depress in response to user-applied pressure (such as a user's touch) and to return to its original state when the user-applied pressure is removed. Such buttons provide haptic feedback to the user, which may encourage the user to use less pressure when interacting with the touch panel, thereby reducing a potential source of stress that may eventually cause the control panel 102 to fail.

FIG. 8 is an illustrative example of a portion 800 of a field-configurable user interface circuit 400 that includes field-programmable matrix elements 802, 804, 806, 810, 812, and 814 according to an embodiment. Portion 800 further includes external connectors 808 and 816. In the illustrated example, external connector 808 couples matrix element 802 to matrix element 806, and external connector 816 couples matrix element 810 to matrix element 812. However, other configurations are possible. Further, such externally programmable connectors may be provided through one or more of matrices 410, 412, 416, and 420 to provide configurability for a wide range of controllers and button configurations.

Figure 9:
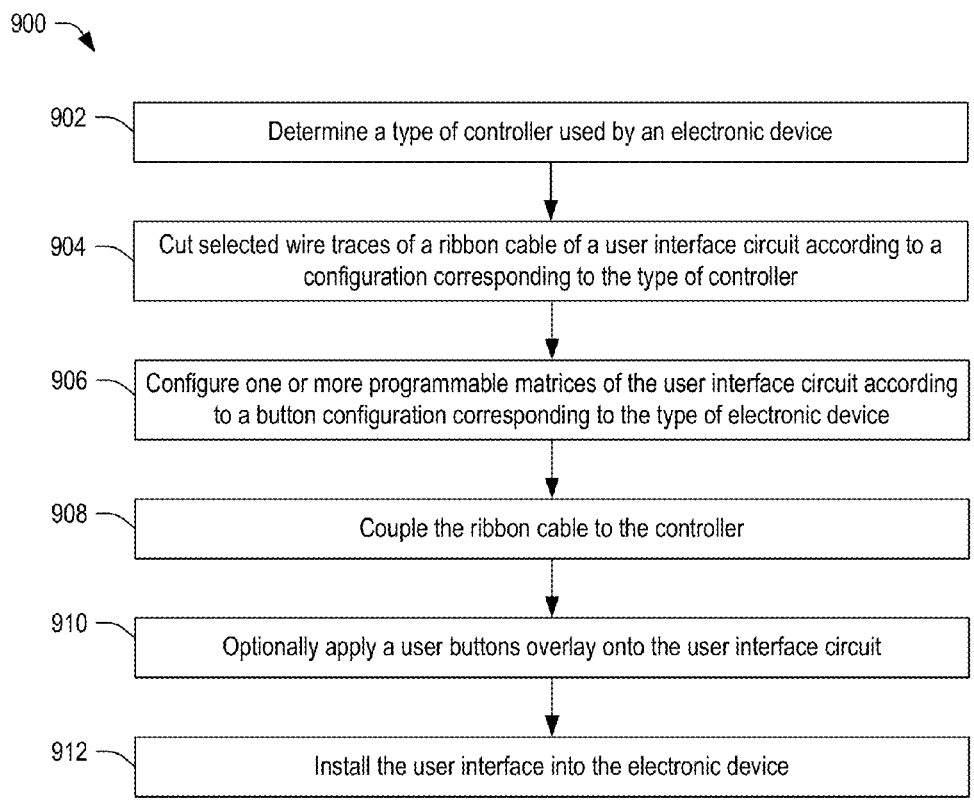
FIG. 9 is a method of repairing an appliance using the field-configurable user interface circuit of FIG. 4 according to an embodiment.

FIG. 9 is a method 800 of repairing an appliance using the field-configurable user interface circuit 400 of FIG. 4 according to an embodiment. At 902, the technician determines the type of controller used by an electronic device. The technician may make this determination by examining the make and model number of the unit and by looking up the information in a table. The table may indicate one or more of the wire traces within the ribbon cable 408 that should be cut to provide the desired functionality of the appliance. In another embodiment, the technician may visit a web site using a computing device, such as his/her smart phone. On the web page, the user may type in the make and model number (or the controller type) for the appliance, and the web site may provide instructions for configuring the ribbon cable for the particular type of controller. In such an example, the web site may interface to a database of appliances, controllers, and part information. In an embodiment, the technician may enter make and model information for the electronic device into a field of a web page and, in response thereto, may receive an indicator identifying the one or more wires of the ribbon cable to be cut to configure the user interface circuit. The indicator may be an image, instructions, or other information directing the technician to cut the selected wires to configure the ribbon cable.

Continuing to 904, the technician cuts the selected wire traces of the ribbon cable of the user interface circuit according to a configuration corresponding to the type of controller. The technician may align a cable configuration tool 501 to the selected wire traces of the ribbon cable 408 within the punch out region 428 and may apply pressure to the tool 501 to cut the selected wire traces.

Advancing to 906, one or more of the programmable matrices of the user interface circuit may be configured according to a button configuration corresponding to the type of the electronic device (e.g., make, model, etc.). In an embodiment, the technician may configure one or more matrix interconnections using an external connector, such as external connectors 808 and 816 in FIG. 8. Continuing to 908, the technician couples the ribbon cable to the controller.

Moving to 910, the technician may optionally apply a user buttons overlay onto the user interface circuit. In some embodiments, the user interface circuit may include a button overlay.

Advancing to 912, the technician installs the user interface into the electronic device. In an embodiment, the technician presses the user interface into a control panel housing in such a way as to present the button selection functionality to a user. In an embodiment, the appliance or electronic device includes an opening sized to receive the user interface, and the user interface is installed into the electronic device and extending at least partially within the opening.

The method 900 is illustrative only. The blocks of method 900 may be ordered differently without departing from the scope of the present disclosure. For example, in some embodiments, application of the user buttons overlay (block 910) may be performed after installation of the user interface (block 912) In another embodiment, application of the user buttons overlay (block 910) may be omitted. In still another embodiment, the programmable matrices may be configured during manufacture, instead of by the technician, such that the configuration of the one or more programmable matrices (block 806) may be omitted.

In the above-examples of FIGS. 4-9, a user interface circuit is described that includes a ribbon cable that is configurable by a user for operation with a particular type of controller of an electronic appliance. Though the ribbon cable is described as being coupled to the user interface circuit, it is also possible to provide multiple ribbon cables that may be partially configured for use with a particular type of controller and that include the option for further configuration by a technician. Two possible examples are provided with respect to FIG. 10.

Figure 10:
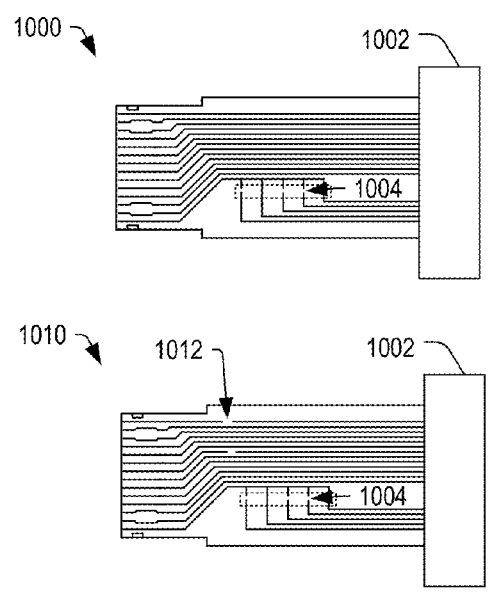
FIG. 10 depicts representative examples of interchangeable and configurable ribbon cables according to an embodiment.

FIG. 10 depicts representative examples of interchangeable and configurable ribbon cables 1000 and 1010 according to an embodiment. In a first example, ribbon cable 1000 is shown that includes a connector 1002 that is configured to couple to configurable user interface 400. Ribbon cable 1000 is the same as ribbon cable 408, except that it includes connector 1002. In the illustrated example, ribbon cable 1000 includes several punch outs 1004 within punch out area 428, configuring the ribbon cable 1000 for a particular controller. By making the ribbon cable 1000 removably attachable to field-configurable circuit 400, the technician may select a suitable ribbon cable 1000 and configure it prior to installation. If the technician makes a punch out error, he or she may select another ribbon cable and reconfigure it by punching out the appropriate wires.

Further, such ribbon cables may be pre-configured for a certain manufacturer's controllers. For example, ribbon cable 1010 includes pre-formed open circuits, such as open circuit 1010 that may correspond to a particular manufacturer. The user may then further configure the ribbon cable 1010 for the particular device type and model by punching out one or more of the wires, such as punch out 1004.

In an embodiment, the field-configurable user interface circuit and/or the ribbon cables may be produced for use in servicing and repairing electric devices that are already in use. In some instances, the field-configurable user interface circuit and/or the ribbon cables may be produced to service discontinued units and models.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   determining a type of controller used by an electronic device;
   determining a connector configuration of a user interface circuit based on the type of controller; and
   selectively cutting one or more wires, but not all of the wires, of a ribbon cable configured to couple the user interface circuit to a controller of the electronic device in response to determining the connector configuration to configure a control function of the user interface circuit for operation with the type of controller.

2. The method of claim 1, further comprising determining the connector configuration includes:
   entering make and model information for the electronic device into a field of a web page; and
   receiving an indicator identifying the one or more wires of the ribbon cable to be cut to configure the user interface circuit.

3. The method of claim 1, further comprising determining the connector configuration includes:
   looking up the type of controller in a table that includes an indicator identifying the one or more wires of the ribbon cable to be cut to configure the user interface circuit.

4. The method of claim 1, further comprising cutting the one or more wires includes punching one or more holes through the ribbon cable at selected locations to cut the one or more wires.

5. The method of claim 1, further comprising selectively applying one or more external connectors to couple selected wire traces to configure a wire trace matrix of the user interface circuit.

6. The method of claim 1, further comprising applying a user buttons overlay to a surface of the user interface circuit.

7. The method of claim 1, further comprising coupling the ribbon cable to a controller of the electronic device.

8. A user interface comprising:
a circuit board including a plurality of wire traces formed thereon, at least some of the plurality of wire traces defining a programmable wire trace matrix; and
a ribbon cable including a plurality of wires configured to couple to the plurality of wire traces and configured to couple to an external circuit including a controller, the ribbon cable is configurable for use with a plurality of types of controllers by selectively cutting one or more, but not all, of the plurality of wires of the ribbon cable based on the type of the controller to configure the programmable wire trace matrix.

9. The user interface of claim 8, further comprising the ribbon cable includes a connector configured to couple to a corresponding feature on the circuit board.

10. The user interface of claim 8, further comprising the circuit board is a flexible circuit.

11. The user interface of claim 8, further comprising the circuit board includes a plurality of button circuit structures.

12. The user interface of claim 11, further comprising a user button overlay configured to couple to a surface of the circuit board and including one or more printed elements corresponding to the plurality of button circuit structures.

13. The user interface of claim 11, further comprising a user button overlay configured to couple to a surface of the circuit board and including one or more depressible button elements corresponding to the plurality of button circuit structures.

14. The user interface of claim 8, further comprising the circuit board includes a plurality programmable wire trace matrices that may be configured to configure interconnections between circuit structures of the circuit board and the plurality of wires of the ribbon cable.

15. A user interface comprising:
a circuit board including a plurality of circuit structures interconnected by at least one programmable wire trace matrix; and
a ribbon cable including a plurality of wires configured to couple to the circuit board and to an external circuit, the ribbon cable including a punch out region extending over at least some of the plurality of wires, the ribbon cable configurable by a user to allow the circuit board to function in connection with the external circuit by selectively cutting one or more, but not all, of the plurality of wires within the punch out region.

16. The user interface of claim 15, further comprising a user buttons overlay configured to attach to a surface of the circuit board and including visible indicators corresponding to one or more of the plurality of circuit structures.

17. The user interface of claim 16, further comprising the user buttons overlay including a plurality of depressible buttons corresponding to button circuit structures of the plurality of circuit structures.

18. The user interface of claim 16, further comprising the user buttons overlay including a plurality of printed elements corresponding to button circuit structures of the plurality of circuit structures.

19. The user interface of claim 15, further comprising the ribbon cable including at least one punch out region extending over one or more of the plurality of wires, the one or more of the plurality of wires being spaced apart within the at least one punch out region to allow a user to punch a hole through a single wire of the plurality of wires without punching a hole in other wires of the plurality of wires.

20. The user interface of claim 15, wherein the user interface is configurable for use with a plurality of models of electronic appliances.

* * * * *